United States Patent [19]

Hoch et al.

[11] 3,756,517

[45] Sept. 4, 1973

[54] FORAGE BLOWER WITH RECUTTER

[75] Inventors: Manfried L. Hoch, Lockport; Peter Sammarco, Bellwood, both of Ill.

[73] Assignee: International Harvester Company, Chicago, Ill.

[22] Filed: July 1, 1971

[21] Appl. No.: 158,717

[52] U.S. Cl............... 241/56, 241/74, 241/86, 241/277
[51] Int. Cl............................................. B02c 18/00
[58] Field of Search................... 146/107 L, 107 T; 241/56, 74

[56] References Cited
UNITED STATES PATENTS

| | | | |
|---|---|---|---|
| 2,325,101 | 7/1943 | Bonnafoux | 241/56 X |
| 2,416,043 | 2/1947 | Bucher-Guyer | 146/107 |
| 2,424,316 | 7/1947 | Johnston | 241/56 X |
| 3,566,943 | 3/1971 | Witt | 146/107 |

FOREIGN PATENTS OR APPLICATIONS

| | | | |
|---|---|---|---|
| 153,734 | 8/1952 | Netherlands | 241/56 |
| 1,507,594 | 12/1969 | Germany | 241/56 |

*Primary Examiner*—Willie G. Abercrombie
*Attorney*—Floyd B. Harman

[57] ABSTRACT

A forage blower having a recutter coaxial with an impeller mounted within a common housing. Material is entered axially into a cylindrical foraminous cage of the recutter and is sheared by blades of a chopper rotatable within the cage. The cut material is thrown circumferentially and radially out of the cage into the impeller paddles which sweep the recut material into an outlet.

2 Claims, 5 Drawing Figures

PATENTED SEP 4 1973
3,756,517
SHEET 1 OF 2
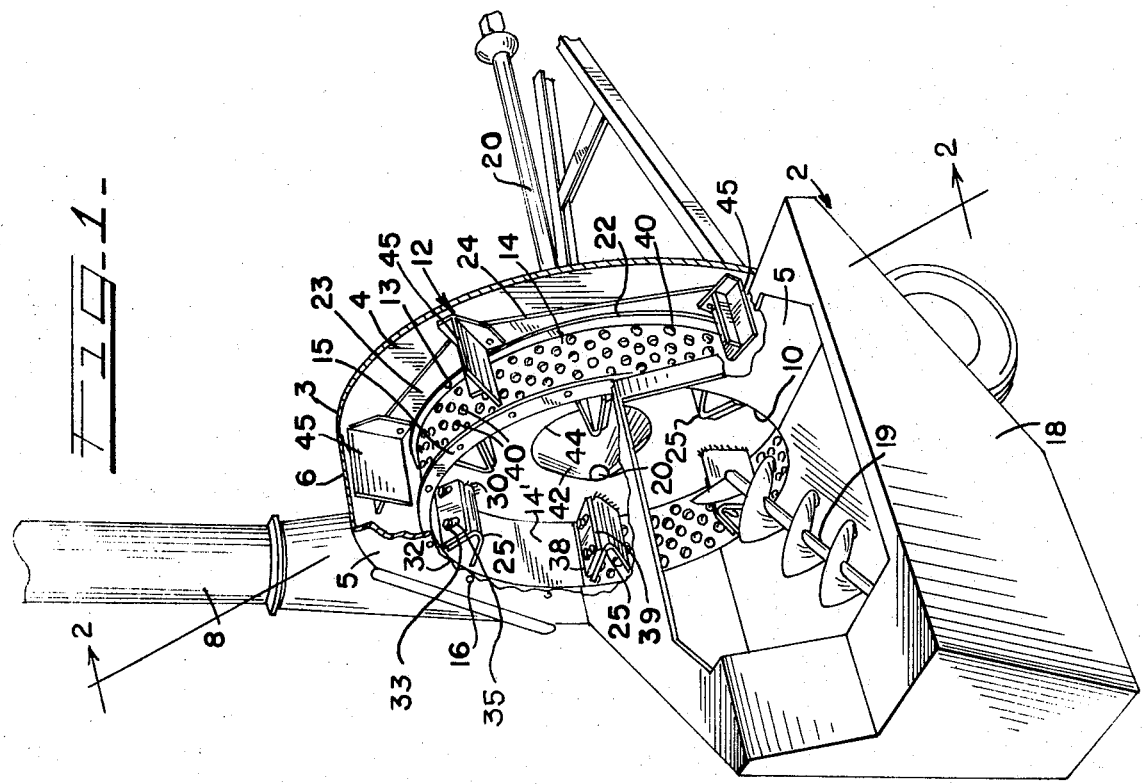
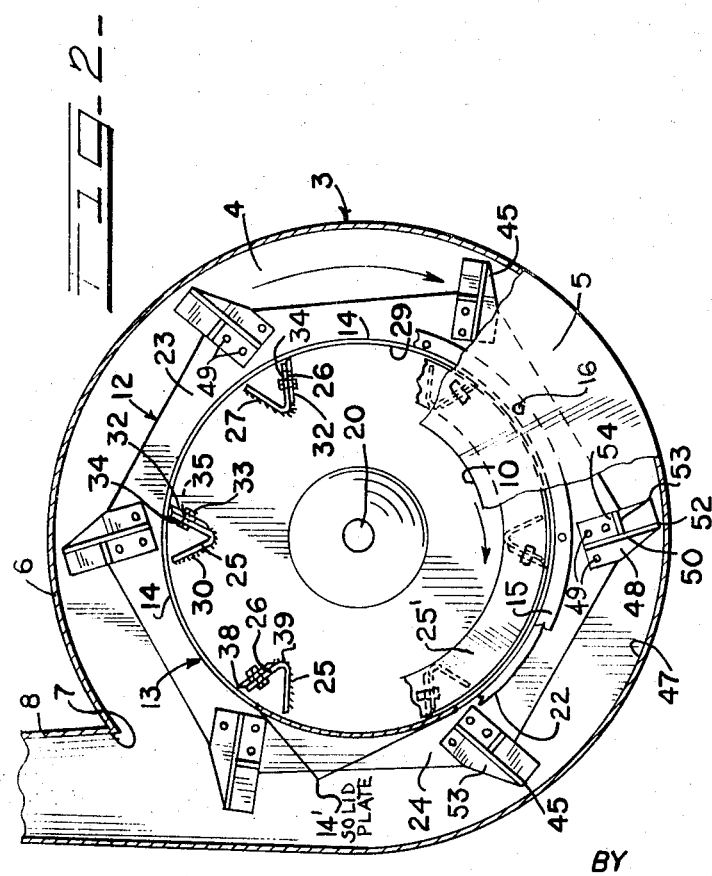
INVENTORS
MANFRIED L. HOCH
PETER SAMMARCO
BY John J. Dowalik
ATT'Y

PATENTED SEP 4 1973 3,756,517

INVENTORS
MANFRIED L. HOCH
PETER SAMMARCO

BY John J. Kowalik
ATT'Y

FORAGE BLOWER WITH RECUTTER

DISCUSSION OF THE PRIOR ART

In some prior art devices, the cutting mechanism associated with a blower comprises radial blades which shear the oncoming material at the inlet opening. In such previous recutter-blowers, the length of cut is the function of the speed of the material passing through the inlet across the shear bar and the speed of rotation of the impeller. The speed of the impeller is preset to the power output of the prime mover to the requirement that the material is moved the required distance. The number of cutter blades which can be mounted on the rotor to obtain a fine cut cannot be arbitrarily increased since an excessive number would impede the flow of the material into the blower inasmuch as such blades sweep across the inlet opening. Thus the length of cut on such devices is limited and any length of material is cut only once.

In other prior art devices utilizing a recutter screen, the material is entered transaxially of the cutter over a shear bar and then such material is cut by the blades of the cylindrical cutter against the shear bar and carried by the blades of the cutter to a perforated screen through which the material is sheared. The material in such devices being introduced at the periphery of the cutter is projected into the path of material recirculating in the device causing it to lose velocity, and interrupting its action against the recutter screens. It is our opinion that this is a prime source of inefficiency in the conventional machines.

SUMMARY OF THE INVENTION

A distinct need has been generated in recent years for a recutting device which can be used in conjunction with a conventional forage blower. This need has evolved primarily from the increasing demand for finer, more uniformly chopped forage for storage and handling in modern, automated systems. New farm practices, such as the use of ear corn silage as a high energy feed, have also dictated that new types of equipment be developed to process such materials. Several manufacturers have attempted to satisfy this need with machines which are simply a combination of a forage harvester cutter head and recutter system with an ordinary forage blower. These machines are costly to produce, and for reasons which will be explained in detail later, inefficient to operate.

A general object is to provide an entirely new and different type of machine — an integral design which is intended to eliminate many of the shortcomings, both economic and functional of current machines.

The principles of the invention in conceptual form are embodied in a machine consisting of two interrelated functional areas; a recutter mechanism and a forage blower. All the moving parts of both mechanisms are mounted on a single shaft supported on a single set of bearings. The recutter mechanism is located nearer the center of the machine, and the blower portion surrounds it. The external configuration of the machine would appear only slightly different from a conventional blower, such as the International Harvester 56 Forage Blower. Conversely, all current units employ a distinctly separate recutter mechanism, with separate drives, bearings, housings and feed elements. The inefficiency of the current method from the standpoint of weight and cost, as well as power requirement for operation should be obvious.

In addition to cost considerations, the inventions herein disclosed have other distinct advantages, namely:

1. Introducing the material nearer the "eye" of the blower will improve efficiency by providing for more gradual acceleration of the material. Considerable energy is lost when a conventional blower impacts the material being processed. The primary reason that conventional blowers are not fed at the "eye" is that the material discharge is not desirable and material tends to recirculate. In the instant structure, the cutoff point is controlled by internally shielding the recutter, to be assured that essentially all the material in the blower portion will discharge, and that none of it will be carried over for a second cycle. Recycling will occur within the recutter, as it does in all recutters on the market today. However, this recirculating material will not impact against incoming material. There will be continuous, smooth, one-way flow of material through the system, something no other current system offers.

2. The material discharged from the recutter will leave it with its major velocity component in the direction in which it will travel in the blower. In conventional recutter systems, the material is accelerated nearly instantaneously in the recutter; stopped once past the recutter, and then again nearly instantaneously accelerated in the blower. The invention should therefore obviously prove to be much more efficient.

3. The conventional forage blower is analogous to a centrifugal pump. For greatest efficiency as a pump, the fluid (air) should be introduced at, or near the center or "eye" of the rotor. However, the introduction of a second material into the "pump" complicates the situation, and historically, feed openings for forage blowers have been located nearer the periphery. This is because material introduced near the periphery can be discharged in approximately 90° of blower rotation with a minimum of "carry over" and consequent impingement against the cutoff point. The consideration is then primarily geometric, rather than functional, since the desired direction of discharge is vertical. The fact that the introduction of air near the periphery is not entirely desirable is evidenced in current forage blowers. Air actually escapes from the blower into the hopper through the feed opening. The effect of this escaping air may be minimized by the hopper configuration — nontheless, it exists, and indicates an area of inefficiency.

4. The introduction of material in a generally axial direction serves an important function as well. Introducing material in this manner does not interfere with the material already recirculating within the system or interrupt its flow. The radial introduction of material in conventional blower/recutters introduces the new material directly into the path of material recirculating in the device, causing it to lose velocity, and interrupting its action against the recutter screens. We feel that this is a prime source of inefficiency in the conventional machines.

This invention is directed to a novel forage blower with a recutter, wherein the recutter is constructed and arranged to admit a large volume of material and functions to propel the material radially into the impeller paddles and circumferentially toward the outlet.

A general object of the invention is to devise a novel forage blower-recutter combination which facilitates the flow of material therethrough in an effective and efficient manner.

A further object is to devise a novel forage blower-recutter device in which the material is introduced into the eye of the blower and discharges into a cylindrical stationary cage which provides shearing elements cooperative with axially elongated rotary blades within the impeller.

In one embodiment the blades are connected to the impeller and in another embodiment the blades are connected to a separate support and driven at a different, preferably faster rate, than the impeller.

The invention comprehends a novel blower-recutter wherein the recutter is effective to obtain a fine cut and the blower and recutter are arranged in radially aligned relation and wherein the material transfer from the recutter to the impeller is in the direction of rotation of the impeller so that the material velocity when it exits the recutter has a significant component toward the discharge opening whereby the energy required by the impellers to move the material to a given distance is substantially less than that required of the impeller to move material having zero velocity as when the material is discharged radially or axially into the impeller.

A still further object of the invention is to provide a novel blower in which the recut material is discharged along a substantial axial extent of the blower housing and impelled centrifugally as well as pneumatically in between the blower paddles whereby power-consuming pulsing is substantially eliminated.

Another object is to provide a novel blower recutter which will cut the material into small increments through a sizing screen which is coaxial with the blower within the loci of the impeller blades.

Another object is to provide a device wherein the material recirculating within the device does not impinge upon incoming material and a one-way flow is established.

These and other objects and advantages inherent in and encompassed by the invention will become more readily apparent from the specifications and the drawings, wherein:

FIG. 1 is a perspective view of one form of the invention with parts broken away;

FIG. 2 is a vertical sectional view taken essentially on line 2—2 of FIG. 1;

DESCRIPTION OF EMBODIMENT OF FIGS. 1 AND 2

Figure 3:
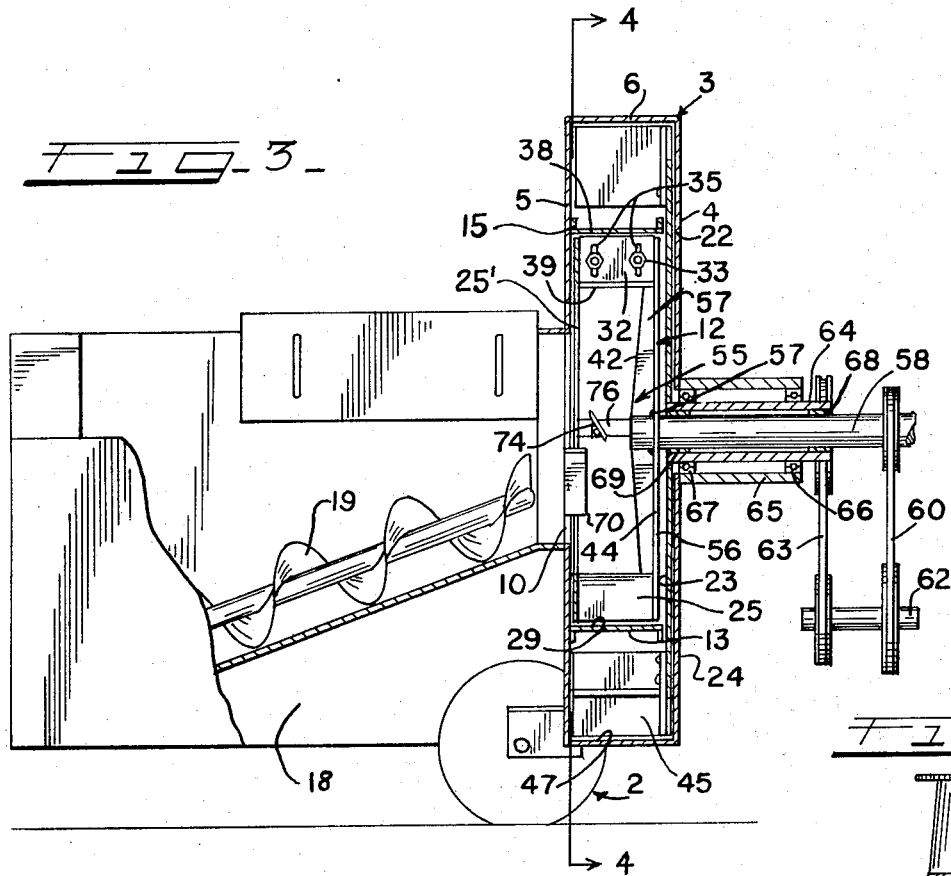
FIG. 3 is a diametrical sectional view of another embodiment taken substantially on line 3—3 of FIG. 4.

Referring to FIGS. 1 and 2 of the drawings, the forage blower generally designated 2 comprises a generally cylindrical casing 3 or housing which has a pair of substantially vertical generally parallel sidewalls 4 and 5 and an annular interconnecting peripheral wall 6 which has an upwardly directed tangential outlet opening 7 communicating with an outlet tube 8. An axial inlet 10 is provided in the sidewall 5 which is open to the eye or the center of the impeller recutter assembly generally designated 12.

The assembly 12 comprises a foraminous cylindrical screen 13 or cage which has a perforated reversible cylindrical body portion 14, except for the impervious solid sheet sector 14' adjacent to the outlet 8. The cage 13 is provided along one edge with an outturned annular flange 15 secured as by bolts 16, 16 to the wall 5 in axial alignment with the inlet opening 10 through which crops are fed from a hopper 18 by an auger 19 as described in U.S. Pat. No. 3,302,978, or by any other suitable means the material being entered near the axis 20 (FIG. 2) of the impeller in a direction converging with the plane of the impeller toward the outlet opening.

Figure 4:
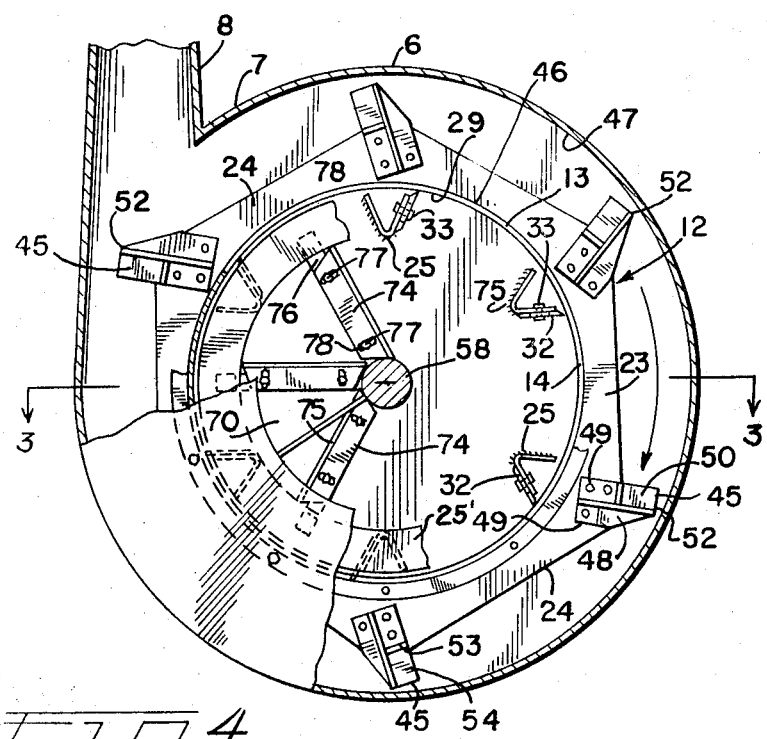
FIG. 4 is a transaxial sectional view taken substantially on line 4—4 of FIG. 3.

The inner end of the cage 13 is also provided with an outturned flange 22 which is in close opposition to the outer face 23 of the impeller mounting plate 24 to which are attached the inner ends of a series of V-shaped knife mounting supports 25, 25 which are arranged in an annular pattern at uniform intervals about the axis 20. The outer ends of the holders are connected as by welding to a ring 25' (FIG. 2). These knife holders 25 project within the cage 13 and the apices of these V-shaped brackets 25 are directed toward the axis 20 and the leading and trailing flanges 26 and 27 diverge toward the inner periphery or surface 29 of the cage 13. The inner ends of the brackets 25 are suitably weld-connected as at 30 to the outer face 23 of the mounting plate 24. A knife 32 is mounted on the outer side of each leading flange 26 and is adjustably secured thereto by the combination adjusting-securing means 33 in the nature of nut and bolt assemblies which extend through suitable apertures 34 and 35 in the mating flange 26 and knife 32. As best seen in FIG. 3 each aperture 35 in each knife 32 is a slot elongated normal to the cutting edges 38 and 39 located along the leading and trailing edges of each blade 32. These cutting edges as best seen in FIG. 2 are reversely beveled and it will be appreciated that upon edges 38 becoming dulled each knife 32 is reversible so as to locate the edge 39 in shearing cooperation with the sharp edged openings 40, 40 in the body 14 of the cage 13. It will be observed that shaft 20 which constitutes the axis of rotation of the impeller is fitted with a conical shield 42 which focuses toward the inlet opening and has its base 44 seated against the surface 23 whereby as the material is entered into the inlet opening it will immediately be diverted toward the interior periphery of the cage and will be carried by the knives about the interior and shredded against the edges of the openings 40 whereupon the material is discharged outwardly radially of the cage and propelled in the direction of rotation of the impeller blades 45. This movement of the material is also induced by the air velocity created by the blades 45 which are suitably connected about the periphery of the plate 24. The material cut through the screen is confined between the external side 46 of the cage 13 and the internal side 47 of the housing wall 6 and is impelled by the impeller blades 45 in the same direction as the material is discharged from the cage. This material is carried by the impeller blades to the outlet opening and discharged therethrough into the discharge duct 8. Each impeller blade may comprise a mounting plate 48 which seats against the interior side 23 of the plate 24 and is secured thereto as by bolts 49, 49. The plate 48 is connected to the inner edge of a paddle 50 which extends substantially normal to the plate 48 and preferably angled toward its outer end 52 in the direction away from the direction of rotation of the impeller. As best seen in FIG. 4 the position of each paddle thus is compatible with the most efficient discharge of the material through the outlet. The back side of each paddle plate 50 is enforced by a gusset 53 which is connected between the backside of the paddle plate 50 and the outer side 54 of the portion of the mounting plate 48 behind the paddle 50. The plate 23 may be of hexagonal shape as best seen in FIG. 2 to reduce the weight and bulk of the impeller.

DESCRIPTION OF THE EMBODIMENT OF FIGS. 3 AND 4

Referring now to FIGS. 3 and 4, it will be noted that the parts common with the previous embodiment are numbered with the same reference numerals. The chopper generally designated 55 comprises the back plate 56 which is preferably connected as by welding at 57 to a drive shaft 58. The plate 56 is connected with the conical element 57 and also with the mounting brackets 25 as shown in FIG. 4. The shaft 58 is connected through a power train 60 to a power input shaft 62 of any suitable power source. The power source shaft 62 is connected through a power train 63 to a quill 64 suitably journalled within a sleeve 65 by bearing 66 and 67, the quill providing journal bearings at 68 and 69 for the rotor and having its inner end weld-connected to the plate 23 for driving the impeller. In the embodiment shown in FIGS. 3 and 4 a shear bar 70 is secured to the sidewall 5 and projects across the opening 10 toward the shaft 58 and shearingly cooperates with a plurality of radially disposed knives 74, 74. These knives have leading cutting edges 75, and each being carried by brackets 76 suitably welded to the mounting plate 55 and ring 25'. The blades 75 are adjustably secured to the respective mounting bracket 76 by means of bolts 77 which extend through elongated slots 78, 78. Thus the knives, which are mounted at a converging angle to the shear bar 70, are adjustable in and out with respect to the shear bar 70. In this embodiment material which is being fed through the inlet opening is sheared between the knives 74 and the shear bar 70 and then enters into the rotor which is defined by the axially extending mountings 25 and the blades 32 thereon whereupon the material through a centrifugal action is thrown between the knives and sheared by the knives through the apertures 40 of the cage. The material which is sheared then is propelled into the portion of the housing between the cage and the paddles 45 and thereupon is swept upwardly and outwardly through the opening 8. It will be realized that once the material enters the rotary cutter it is continuously being impelled in the direction of rotation of the cutter whereby substantially less effort required of the paddles to discharge the material through the discharge tube 18 for a given distance.

DESCRIPTION OF EMBODIMENT OF FIG. 5

Figure 5:
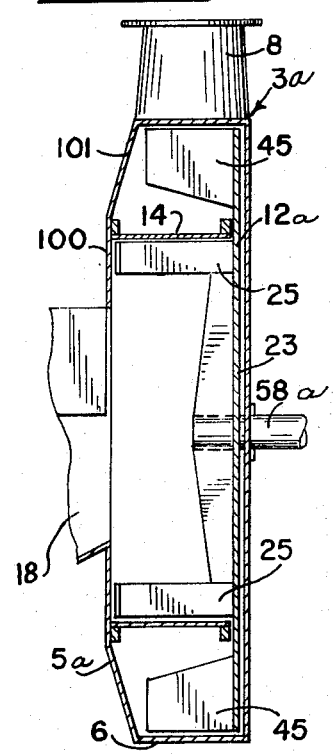
FIG. 5 is a diametrical sectional view of a modified embodiment of the invention.

FIG. 5 illustrates an embodiment which is similar to the previous embodiments and therefore like parts will be identified with the same reference numerals. It will be observed that in this embodiment the center portion designated 100 of the casing housing 3a is widened by making the end portions 101 of the wall 5a frusto conical in form. Therefore the rotor designated 12a and cage 14a are axially wider than in the previous embodiments. The plate 23 is common to the rotor 14a and paddles 45 which they are attached to its periphery. The shaft 58a rotates the paddles of the impeller and the cutter head at the same speed. However, because of the greater width of the recutter mechanism a greater volume of the material is recut under the same conditions over that recut by the previous embodiments and recut material cascades radially outwardly and is guided by the funnel portion 101 into the path of the paddles which sweep the material about the peripheral wall 6 and out through the outlet pipe 8. Flow of the material is substantially the same as in the previous embodiment and essentially the same advantages accrue.

The solid or imperforate sheet 14' is provided to prevent recutting of the material in the area of discharge of the blower to prevent interference with the outflow of the material and to eliminate recirculation of the cut material in the blower. In the case where it is not required functionally, the sheet 14' may be replaced with an equivalent section of perforated screen.

We claim:

1. A material blower-recutter comprising a housing having a generally cylindrical peripheral wall with an outlet opening and axially spaced side walls interconnected with the peripheral wall, an impeller journaled between said side walls and having paddles about its periphery sweeping said peripheral wall, an open ended generally cylindrical recutter means between said walls and concentric with said impeller, said recutter means comprising a foraminous cage positioned concentric with the axis of said impeller in axial alignment with the inlet and having an impervious segment adjacent to the outlet opening to prevent material from being discharged across the outlet opening.

2. A material blower-recutter comprising a housing having a generally cylindrical peripheral wall with an outlet opening, axially spaced side walls interconnected with the peripheral wall, and a generally axial material inlet opening in one of said side walls, a cylindrical perforated screen mounted on said one of said side walls within said housing and concentric with said peripheral wall, a rotor journaled along the axis of said housing and having cutting blade means operatively disposed in shearing relationship with said screen, and an impeller disposed coaxially with said rotor, said impeller having paddle means disposed between said screen and said housing, said rotor and said screen projecting axially beyond said peripheral wall of the housing, a frusto-conical housing portion on said one of side walls enclosing the portions of the rotor and screen outside the peripheral wall and providing a sloping slide surface toward said peripheral wall for material cut by said rotor and passing through the screen.

* * * * *